(12) United States Patent
Kubo et al.

(10) Patent No.: US 7,363,949 B2
(45) Date of Patent: Apr. 29, 2008

(54) HYDROGEN STATION, METHOD OF CHARGING HYDROGEN, AND VEHICLE

(75) Inventors: Hidehito Kubo, Kariya (JP); Yoshihiro Isogai, Kariya (JP); Daigoro Mori, Mishima (JP)

(73) Assignees: Kabushiki Kaisha Toyota Jidoshokki, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/361,540

(22) Filed: Feb. 24, 2006

(65) Prior Publication Data

US 2006/0180235 A1    Aug. 17, 2006

Related U.S. Application Data

(63) Continuation of application No. PCT/JP2005/017728, filed on Sep. 27, 2005.

(30) Foreign Application Priority Data

Sep. 29, 2004    (JP)    ............................. 2004-284588

(51) Int. Cl.
*B65B 1/04*    (2006.01)
(52) U.S. Cl. .................... 141/82; 222/146.1; 222/146.6
(58) Field of Classification Search .................. 141/82, 141/67, 286, 98, 2, 18, 1; 222/146.1, 146.6
See application file for complete search history.

(56) References Cited

U.S. PATENT DOCUMENTS 5,762,119 A * 6/1998 Platz et al. .................. 141/231
6,911,274 B1 * 6/2005 Colborn et al. ................ 429/19
7,124,790 B2 * 10/2006 Bushko ......................... 141/82
2001/0004013 A1   6/2001 Shingo et al. ............... 165/153
2003/0070434 A1 * 4/2003 Shimada et al. ............. 62/45.1
2004/0247959 A1 * 12/2004 Kimbara et al. .............. 429/20

FOREIGN PATENT DOCUMENTS

| DE | 100 52 856 A1 | 4/2002 |
|---|---|---|
| DE | 101 43 159 A1 | 3/2003 |
| EP | WO 02/064395 A2 | 8/2002 |
| JP | 7-108909 | 4/1995 |
| JP | 2002-61797 | 2/2002 |
| JP | 2002-161998 | 6/2002 |
| JP | 2004-11654 | 1/2004 |
| JP | 2004-116544 | 4/2004 |

OTHER PUBLICATIONS

English Translation of a corresponding International PCT application No. PCT/JP2005/017728 dated Apr. 3, 2007.
European Search Report dated Sep. 17, 2007 issued by European Patent Office for application No. 05788385.2-1268.

* cited by examiner

*Primary Examiner*—Steven O. Douglas
(74) *Attorney, Agent, or Firm*—Morgan & Finnegan, L.L.P.

(57) ABSTRACT

A hydrogen station includes gas storage equipment for storing hydrogen, a dispenser for charging hydrogen gas supplied from the gas storage equipment into a hydrogen tank of a vehicle, and a blower. When charging hydrogen, the blower blows air towards a radiator of the vehicle parked at a predetermined vehicle parking area of the hydrogen station. The current flow of the blower is adjusted in accordance with the heat load on the radiator.

7 Claims, 4 Drawing Sheets

HYDROGEN STATION, METHOD OF CHARGING HYDROGEN, AND VEHICLE

This is a continuation of International Patent Application No. PCT/JP2005/017728 filed on Sep. 27, 2005 claiming priority of Japanese Patent Application No. 2004-284588 filed on Sep. 29, 2004.

BACKGROUND OF THE INVENTION

The present invention relates to a hydrogen station, a method for charging hydrogen, and a vehicle, and more particularly, to a technique suitable for quickly charging hydrogen into a hydrogen tank installed in a vehicle.

Recently, people have become more conscious of the need for suppressing global warming. Thus, hydrogen-fueled automobiles using hydrogen as fuel, such as fuel cell electric automobiles and hydrogen automobiles, have been developed. A typical hydrogen-fueled automobile is provided with a hydrogen tank that is charged with hydrogen gas and functions as a hydrogen supply source.

The use of metal referred to as "hydrogen adsorption alloy" has been given attention as a method for storing and transporting hydrogen. Hydrogen adsorption alloy adsorbs hydrogen and becomes a hydride under certain temperature and pressure conditions and releases hydrogen when necessary under different temperature and pressure conditions. A hydrogen tank using hydrogen adsorption alloy has been given attention since it can store more hydrogen with the same volume than a hydrogen tank that does not use hydrogen adsorption alloy.

The hydrogen gas is filled into a hydrogen tank at a hydrogen station, which is a facility equivalent to a gas station or an LP gas station. The hydrogen station includes, for example, a hydrogen cylinder assembly provided with a plurality of cylinders, and a dispenser (charger) for charging hydrogen supplied from the hydrogen cylinder assembly into the hydrogen tank of a vehicle. A coupler arranged at the distal end of a hose of the dispenser is coupled to a charging port of the hydrogen tank. In this state, the pressure difference produced between the hydrogen cylinder assembly and the hydrogen tank charges hydrogen gas into the hydrogen tank.

The temperature in the hydrogen tank rises when charging hydrogen gas into the hydrogen tank. Thus, the hydrogen tank must be cooled during the charging. Otherwise, much time becomes necessary for the charging of hydrogen. Further, when increasing the charging amount of hydrogen by having the hydrogen adsorption alloy adsorb hydrogen, hydrogen adsorption reaction occurs and causes an exothermic reaction. Thus, the hydrogen adsorption alloy must be cooled so that the hydrogen adsorption reaction occurs smoothly.

As a hydrogen supply system suitable for a hydrogen fueled automobile equipped with a hydrogen tank using hydrogen adsorption alloy, a hydrogen station provided with a coolant supply system for supplying the hydrogen tank with coolant to cool the hydrogen adsorption alloy in the hydrogen tank has been proposed (for example, refer to Japanese Laid-Open Patent Publication No. 7-108909). A hydrogen fueled automobile includes a coolant circulation system through which coolant for cooling the engine is circulated. When supplying the hydrogen gas from the hydrogen tank to the engine, the coolant in the coolant circulation system that has been heated after cooling the engine is used to heat the hydrogen adsorption alloy. In addition to the coolant circulation system, the hydrogen supply system includes a pipe for supplying coolant to cool the hydrogen tank when charging hydrogen gas into the hydrogen tank and a pipe for discharging the coolant.

However, in the hydrogen supply system described in Japanese Laid-Open Patent Publication No. 7-108909, a passage for the flow of a heat medium that heats the hydrogen adsorption alloy when hydrogen is being released from the hydrogen adsorption alloy, and a passage for the flow of the coolant that cools the hydrogen adsorption alloy when adsorbing the hydrogen to the hydrogen adsorption alloy must be separated in the hydrogen tank. Thus, the structure of the hydrogen tank becomes complex and the hydrogen tank becomes large.

The applicant of the present application has proposed the following system as a heating/cooling system for a fuel cell automobile provided with a hydrogen tank using hydrogen adsorption alloy. Specifically, in the system, a heat medium that has cooled the fuel cell is used as the heat medium for heating the hydrogen adsorption alloy when releasing the hydrogen from the hydrogen adsorption alloy. Further, the same heat medium used as the heat medium for heating the hydrogen adsorption alloy is used as the heat medium for cooling the hydrogen adsorption alloy when the hydrogen adsorption alloy adsorbs hydrogen. In this system, the heat medium is cooled by a radiator installed in the fuel cell automobile. During the operation of the fuel cell, the hydrogen adsorption alloy is heated by the heat medium that has cooled the fuel cell and the heat medium is then cooled by the radiator. In this case, the cooling of the fuel cell and the heating of hydrogen adsorption alloy are performed in a satisfactory manner. However, when the hydrogen adsorption alloy adsorbs hydrogen, that is, when charging a large amount of hydrogen (e.g., 5 kg) into the hydrogen tank under a high pressure (e.g., 35 MPa) within a short period of time (e.g., within 5 min.), the heat generated by the hydrogen adsorption alloy and the heat generated by the compression of the hydrogen gas cannot be sufficiently released by just cooling the heat medium with a normal vehicle radiator and fan. The value of 5 kg for the charging amount of the hydrogen is the value required for the fuel cell automobile to travel 500 km, which is about the same as a gasoline fueled automobile, with a single hydrogen charging.

When charging hydrogen under an environment in which the ambient temperature is 30° C. while cooling the heat medium with a normal vehicle radiator and fan, with the radiator having a coolant flow rate of 60 L/min and the fan producing a maximum current velocity of 2 m/s, only about 85% of the 5 kg, that is, only 4.25 kg of hydrogen can be charged in five minutes when the hydrogen tank is empty. In order to charge 95% (4.75 kg) or more of the 5 kg of hydrogen in five minutes, the current velocity produced by the fan must be 6 m/s or higher. However, to use a fan capable of producing such current velocity in a fuel cell automobile, a large installation space is required. Further, the fan has surplus capability at times other than hydrogen charging.

If an outlet and an inlet are provided for the heat medium in a heat medium circulation passage formed in a fuel cell automobile and when charging hydrogen into the hydrogen tank at a hydrogen station, a heat medium cooling passage of the hydrogen station is connected to the outlet and the inlet of the heat medium circulation passage of the fuel cell automobile to cool the heat medium at it circulates in the hydrogen station. However, there is usually more than one type of heat media and the heat medium usually differs between manufacturers. Thus, heat media must be prepared at a hydrogen station in accordance with the various types of heat media used in fuel cell automobiles. Further, when charging hydrogen, the connection of the heat medium circulation passage to the heat medium coolant passage is burdensome.

SUMMARY OF THE INVENTION

A first object of the present invention is to provide a hydrogen station and a method for charging hydrogen that optimally cools a hydrogen tank and shortens the time for charging hydrogen. A second object of the present invention is to provide a vehicle that efficiently cools the radiator when charging hydrogen at a hydrogen station.

One aspect of the present invention is a hydrogen station for charging hydrogen into a hydrogen tank installed in a vehicle including a radiator. The hydrogen station includes gas storage equipment for storing hydrogen. A dispenser charges the hydrogen tank with hydrogen supplied from the gas storage equipment. A blower for blowing air towards the radiator.

A further aspect of the present invention is a method for charging hydrogen into a hydrogen tank installed in a vehicle. The vehicle includes a heat medium flow passage through which a heat medium for cooling the hydrogen tank flows, a radiator for cooling the heat medium flowing through the heat medium flow passage, and a fan for blowing air towards the radiator. The method includes charging hydrogen into the hydrogen tank with the vehicle parked at a hydrogen station, and blowing air from a blower arranged at the hydrogen station towards the radiator with a current flow greater than that of the fan when charging the hydrogen.

Another aspect of the present invention is a vehicle for use with hydrogen as a fuel source for the vehicle. The vehicle includes a hydrogen tank for storing hydrogen. A radiator cools the hydrogen tank when charging the hydrogen tank with hydrogen. The radiator is arranged in a compartment located at a front portion of the vehicle. A hood opens and closes and covers an upper opening of the compartment. A front grille is formed integrally with the hood. The front grille is located at a position corresponding to at least the front of the radiator when the hood is closed and exposing the radiator from the front of the vehicle when the hood is open.

A further aspect of the present invention is a vehicle for use with hydrogen as a fuel source for the vehicle. The vehicle includes a hydrogen tank for storing hydrogen. A radiator cools the hydrogen tank when charging the hydrogen tank with hydrogen. The radiator is arranged in a compartment formed in the vehicle. The vehicle further includes a passage for enhancing discharge of air from the compartment. The air is blown from outside the compartment towards the radiator and flowing through the radiator.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A first embodiment of the present invention will now be described with reference to FIGS. 1 and 2.

Figure 1:
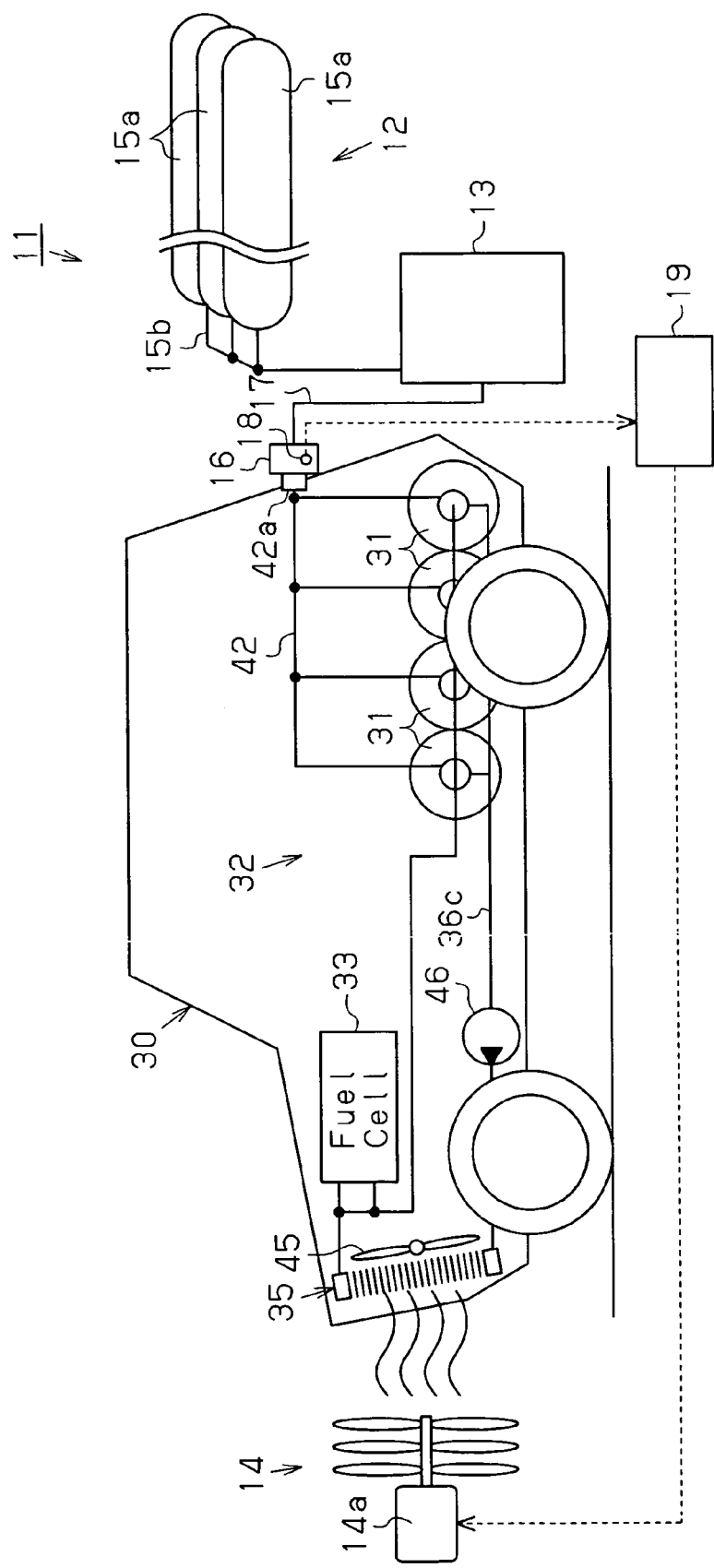
FIG. 1 is a schematic diagram showing a hydrogen station and a vehicle according to a first embodiment of the present invention.
Figure 2:
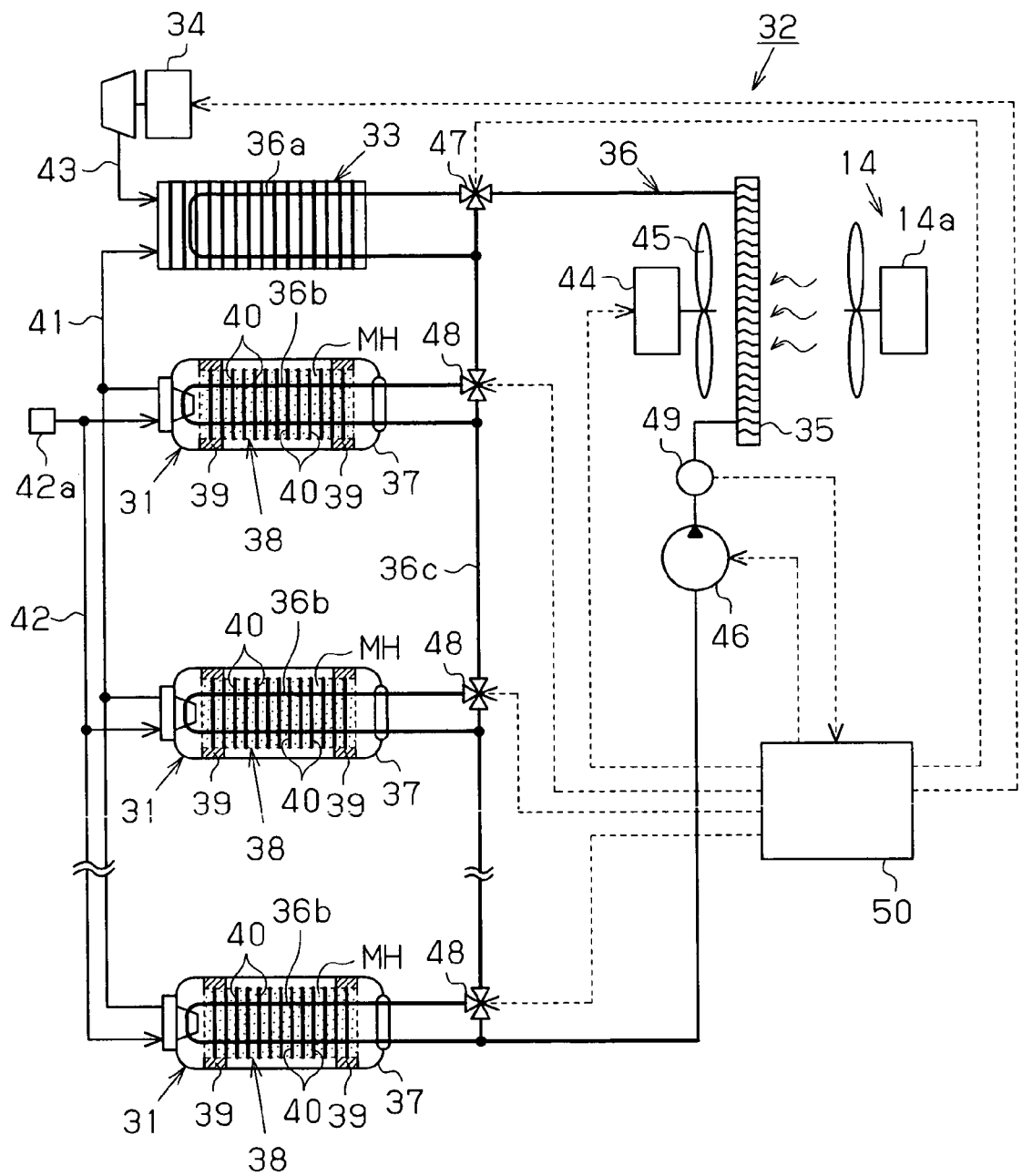
FIG. 2 is a schematic diagram showing a fuel cell, a hydrogen tank, and a heat medium flow passage.

As shown in FIG. 1, a hydrogen station 11 includes gas storage equipment 12 for storing hydrogen gas, a dispenser (charger) 13 for charging hydrogen gas supplied from the gas storage equipment 12 into a plurality of hydrogen tanks 31 installed in a vehicle 30, and a blower 14. In FIG. 1, the ratio between the sizes of the vehicle 30, the gas storage equipment 12, the dispenser 13, the blower 14 and the like differs from actual size.

The vehicle 30 is a fuel cell automobile, of which the drive source is a fuel cell, and includes a fuel cell system 32. As shown in FIG. 2, the fuel cell system 32 includes the hydrogen tanks 31, a fuel cell 33, a compressor 34, and a radiator 35. A heat medium flow passage 36 connects the hydrogen tanks 31, the fuel cell 33, and the radiator 35. There are four hydrogen tanks 31 as shown in FIG. 1, but only three hydrogen tanks 31 are shown in FIG. 2.

The fuel cell 33 is formed by, for example, a polymer electrolyte fuel cell, and generates electric direct current energy (direct current electric power) through the reaction between the hydrogen supplied from the hydrogen tanks 31 and the oxygen in the air supplied from the compressor 34. To cool the fuel cell 33 during normal operation of the vehicle 30, part of the heat medium flow passage 36 extends through the fuel cell 33 to function as a heat exchanger 36a.

Each hydrogen tank 31 includes a tank body 37, a hydrogen adsorption unit 38 accommodating hydrogen adsorption alloy MH serving as hydrogen adsorption material, and a support 39 for supporting the hydrogen adsorption unit 38 in the tank body 37. Part of the heat medium flow passage 36 extends through each hydrogen tank 31 to function as a heat exchanger 36b. The heat exchanger 36b serves as a flow path for the heat medium and exchanges heat with the hydrogen adsorption alloy MH. In the present embodiment, a long life coolant (LLC) is used as the heat medium. A multiple number of fins 40 are arranged on the periphery of the heat exchanger 36b to enhance the efficiency of heat exchange with the hydrogen adsorption alloy MH. The hydrogen adsorption alloy MH is known in the art.

The hydrogen tanks 31 are connected to a hydrogen supply port (not shown) of the fuel cell 33 through a pipe passage 41 to supply the fuel cells 33 with hydrogen. In a full state, each hydrogen tank 31 stores hydrogen under a high predetermined pressure (e.g., about 35 MPa). The hydrogen released from each hydrogen tank 31 is supplied to the fuel cell 33 in a state depressurized to a constant pressure (e.g., about 0.3 MPa) by a valve (not shown). The hydrogen tanks 31 are connected to a pipe 42, which includes a hydrogen charging port 42a, so that hydrogen gas is simultaneously charged into all of the hydrogen tanks 31 from the pipe 42.

The compressor 34 is connected to oxygen supply ports (not shown) of the fuel cells 33 through a pipe passage 43 to supply the fuel cells 33 with compressed air. The compressor 34 compresses air, from which dust and the like has been removed by an air cleaner (not shown), and discharges the compressed air into the pipe passage 43.

The radiator 35 includes a fan 45 rotated by a motor 44 so as to efficiently release heat from the radiator 35.

Portions of the heat medium flow passage 36 excluding the heat exchangers 36a, 36b form a circulation passage 36c extending from the outlet of the radiator 35 to the inlet of the radiator 35. A pump 46 is arranged in the circulation passage 36c near the inlet of the radiator 35. The pump 46 sends the heat medium in the heat medium flow passage 36 towards the inlet of the radiator 35. The heat medium flow passage 36 has a branched portion, between the inlet of the heat exchanger 36a and the outlet of the radiator 35, where an electromagnetic three-way valve 47 is arranged. The circulation passage 36c extends from the outlet of the radiator 35, passes through the electromagnetic three-way valve 47, and reaches the inlet of the radiator 35. The inlet of the heat exchanger 36a is connected to the electromagnetic three-way valve 47, and the outlet of the heat exchanger 36a is connected to the circulation passage 36c at the downstream side of the electromagnetic three-way valve 47.

The inlet of the heat exchanger 36b of each hydrogen tank 31 is connected to the circulation passage 36c by an electromagnetic three-way valve 48. The outlet of each heat exchanger 36b is coupled to the circulation passage 36c at the downstream side of the corresponding electromagnetic three-way valve 48. Each electromagnetic three-way valve 48 is switchable between a first state, in which the heat medium flowing through the circulation passage 36c enters only the inlet side of the corresponding heat exchanger 36b, and a second state, in which the heat medium flowing through the circulation passage 36c enters only the downstream side of the circulation passage 36c and not the inlet side of the heat exchanger 36b. A temperature sensor 49 for detecting the temperature of the heat medium flowing into the radiator 35 is arranged in the circulation passage 36c near the inlet of the radiator 35. The temperature sensor 49 is located at the downstream side of the pump 46.

The compressor 34, the motor 44, the pump 46, and the electromagnetic three-way valves 47, 48 are operated by a command from a controller 50 of the fuel cell system 32. In accordance with a command signal from the controller 50, the pump 46 starts or stops operating or changes the flow rate of the heat medium. A detection signal of the temperature sensor 49, a detection signal of a temperature sensor detecting the temperature of the fuel cell 33 (not shown), and a detection signal of a pressure sensor detecting the pressure in the hydrogen tank 31 (not shown) are input to the controller 50. The controller 50 wirelessly transmits the information regarding the temperature of the heat medium flowing into the radiator 35 to a drive controller 19 (described later) of the hydrogen station 11 based on the detection signal of the temperature sensor 49.

As shown in FIG. 1, the gas storage equipment 12 is provided with a hydrogen cylinder assembly including a plurality of cylinders 15a, which are connected to one another by a pipe 15b and charged with hydrogen gas under a predetermined pressure. Three cylinders 15a are shown in FIG. 1. However, there are actually ten or more cylinders 15a. The hydrogen gas is charged into each cylinder 15a so that it has a predetermined pressure (e.g., 40 to 45 MPa) in a fully filled state. For instance, if each hydrogen tank 31 is charged with hydrogen to a fully filled level at a pressure of 35 MPa, the pressure of each cylinder 15a in a fully filled state is set to be 44 MPa.

The dispenser 13 is known in the art and includes a hose 17. A coupler 16 is connected to the distal end of the hose 17. The dispenser 13 is equipped with a mass flowmeter, a flow regulating valve, an open-close valve, and the like (not shown). The dispenser 13 charges hydrogen gas supplied from the gas storage equipment (hydrogen cylinder assembly) 12 into the hydrogen tank 31 of the vehicle 30 with the hose 17. The dispenser 13 automatically starts charging hydrogen when the coupler 16 is coupled to the hydrogen charging port 42a of the vehicle 30.

The dispenser 13 includes a detector for detecting that the charging of hydrogen from the dispenser 13 to the hydrogen tank 31 has started. In the present embodiment, the detector is a switch 18 that is turned ON when the coupler 16 of the hose 17 is coupled to the hydrogen charging port 42a.

The blower 14 is located at a position enabling the blowing of air towards the radiator 35 of the vehicle 30, which is parked at a predetermined vehicle parking area in the hydrogen station 11. The blower 14 produces a current velocity (e.g., greater than or equal to 6 m/s) that is greater than the maximum current velocity (e.g., 2 m/s) generated by the fan 45 in the vehicle 30. The blower 14 is drive controlled by the drive controller 19. The drive controller 19 activates the blower 14 based on the ON signal from the switch 18, that is, the detection signal indicating that the charging of hydrogen from the dispenser 31 to the hydrogen tank 31 has started.

The blower 14 includes a motor 14a, of which rotation speed is variably controlled. The drive controller 19 receives information relating to the heat load of the radiator 35, or in the present embodiment, information on the temperature of the heat medium flowing into the radiator 35 from the controller 50 of the vehicle 30 during hydrogen charging, and outputs a control signal to the motor 14a so as to adjust the current flow of the blower 14 in accordance with the heat load of the radiator 35. In other words, the blower 14 is controlled so as to produce a current flow corresponding to the heat load of the radiator 35.

Normal operation of the fuel cell 33 is performed when the ambient temperature is higher than or equal to a predetermined tolerable temperature enabling power generation with the fuel cell 33. The controller 50 recognizes the ambient temperature based on the detection signal of a temperature sensor (not shown) that measures the ambient temperature. The controller 50 performs normal operation with the fuel cell 33 from when the fuel cell 33 is activated if the ambient temperature is higher than or equal to the tolerable temperature, and starts to perform normal operation with the fuel cell 33 after the fuel cell 33 is warmed when the ambient temperature is lower than the tolerable temperature. During normal operation, hydrogen is supplied from the hydrogen tank 31 to the anode electrode of the fuel cell 33. Further, the compressor 34 is driven, and air is pressurized to a predetermined pressure and supplied to the cathode electrode of the fuel cell 33.

The polymer electrolyte fuel cell efficiently generates power at about 80° C. However, the chemical reaction between hydrogen and oxygen is an exothermic reaction. Thus, if power generation continues, the temperature of the fuel cell 33 becomes higher than the appropriate temperature of about 80° C. due to the reaction heat. In order to prevent such temperature rise, the heat medium cooled by the radiator 35 is circulated through the heat medium flow passage 36. Since the release of hydrogen from the hydrogen adsorption alloy MH is an endothermal reaction, the hydrogen adsorption alloy MH must be heated to smoothly perform the reaction. Thus, the warmed heat medium that has cooled the fuel cell 33 is used to heat the hydrogen adsorption alloy MH.

The controller 50 maintains the electromagnetic three-way valve 47 in a state in which the heat medium is supplied to the inlet of the heat exchanger 36a during the operation of the fuel cell 33 and outputs a command signal for switch controlling of each electromagnetic three-way valve 48 based on the detection signal of a pressure sensor that detects the pressure in the hydrogen tanks 31. The controller 50 switches the electromagnetic three-way valves 48 to a state in which the heat medium heats the hydrogen tanks 31, that is, a state in which the heat medium flows through the heat exchangers 36b when the pressure in the hydrogen tanks 31 is lower than or equal to a predetermined first pressure. Further, the controller 50 switches the electromagnetic three-way valves 48 to a state in which the heat medium does not flow through the hydrogen tanks 31 when the pressure in the hydrogen tanks 31 is higher than or equal to a predetermined second pressure.

The controller 50 determines that hydrogen must be charged into the hydrogen tanks 31 when the first pressure has not been reached even after continuously performing heating with the heat medium over a predetermined time in all the hydrogen tanks 31. The controller 50 then drives a warning device (e.g., display such as a lamp), which is arranged in the vehicle and not shown in the drawings.

When charging (storing) hydrogen gas into the hydrogen tank 31, that is, when having the hydrogen adsorption alloy MH adsorb hydrogen, the vehicle 30 is stopped at a predetermined parking area in the hydrogen station 11. The radiator 35 located at the front of the vehicle 30 faces the blower 14 when the vehicle 30 is parked at the predetermined parking area, as shown in FIG. 1. The controller 50 of the fuel cell system 32 switches the electromagnetic three-way valve 47 to a state in which the heat medium flows through the circulation passage 36c without being supplied to the heat exchanger 36a of the fuel cell 33. Further, the controller 50 switches each electromagnetic three-way valve 48 to a state in which the heat medium is supplied to the heat exchangers 36b of the hydrogen tanks 31. Therefore, the heat medium cooled by the radiator 35 is supplied to the heat exchangers 36b of each hydrogen tank 31 without passing through the heat exchanger 36a of the fuel cell 33.

The controller 50 stops driving the fan 45 and continues to drive only the pump 46 when the coupler 16 of the dispenser 13 is coupled to the hydrogen charging port 42a. The driving of the fan 45 is stopped for the following reasons. That is, the blower 14 of the hydrogen station 11 is driven and the blower 14 blows the air towards the radiator 35 from the side opposite the fan 45 during hydrogen charging. The air blown from the blower 14 towards the radiator 35 is stronger than the air blown from the fan 45 towards the radiator 35. The air from the fan 45 thus does not contribute much to the cooling of the radiator 35.

The hydrogen charging to the hydrogen tank 31 is automatically started and the switch 18 is turned ON when the coupler 16 of the dispenser 13 is coupled to the hydrogen charging port 42a. The drive controller 19 of the hydrogen station 11 outputs the drive control signal to the motor 14a and drives the blower 14 based on the ON signal of the switch 18. As a result, the blower 14 blows air against the radiator 35 of the vehicle 30 so that the heat release effect of the radiator 35 becomes higher compared to when heat release is performed by the fan 45 installed in the vehicle 30.

The hydrogen gas supplied from the gas storage equipment (hydrogen cylinder assembly) 12 to the hydrogen tanks 31 reacts with the hydrogen adsorption alloy MH and becomes a hydride, when adsorbed by the hydrogen adsorption alloy MH. Since the adsorption reaction of the hydrogen is an exothermic reaction, the adsorption reaction is not smoothly performed unless the heat generated by the adsorption reaction of the hydrogen is eliminated. However, the heat medium flowing through the heat medium flow passage 36 is efficiently cooled by the radiator 35 and further circulated between the hydrogen tanks 31 and the radiator 35 through the circulation passage 36c and the heat exchangers 36b without flowing through the heat exchanger 36a of the fuel cell 33. Thus, the heat generated by the hydrogen adsorption alloy MH is removed by the heat medium so that the adsorption reaction is smoothly performed. Consequently, from an empty state, the hydrogen tanks 31 are charged to a level greater than or equal to 95% of 5 kg, which is the charged amount when the hydrogen tanks 31 are fully filled. That is, the hydrogen tanks 31 are charged to 4.75 kg from an empty state in five minutes under the condition in which the ambient temperature is 30° C., the flow rate of the heat medium is 60 L/min., and the current velocity generated by the blower 14 is greater than or equal to 6 m/s.

Further, the controller 50 controls the blower 14 so as to adjust the current flow of the blower 14 in accordance with the heat load of the radiator 35, that is, in accordance with the temperature of the heat medium passing through the radiator 35. When cooling the hydrogen tank 31, the control of the blower 14 is simplified by blowing air towards the radiator 35 with a constant current flow from when starting the hydrogen charging. However, the heat load of the radiator 35 is not constant. Therefore, if the current flow is constant when charging hydrogen within a short period of time, useless energy may be consumed when the heat load of the radiator 35 is small since the blower 14 must be driven to generate the current flow required when the heat load of the radiator 35 is maximum until the completion of the hydrogen charging. However, since the blower 14 is controlled to generate the current flow corresponding to the heat load of the radiator 35 in the present embodiment, the energy consumption is reduced even if the time for charging hydrogen is the same as when the current flow is constant.

The present embodiment has the advantages described below.

(1) The hydrogen station 11 includes the gas storage equipment 12 charged with hydrogen gas at a predetermined pressure, the dispenser 13 for charging hydrogen gas supplied from the gas storage equipment 12 to the hydrogen tank 31 of the vehicle 30, and the blower 14 for blowing air towards the radiator 35 of the vehicle 30. Therefore, by blowing air from the blower 14 towards the radiator 35 of the vehicle 30 when charging hydrogen into the hydrogen tank 31 of the vehicle 30, a large amount of air per unit time is blown towards the radiator 35 compared to when using the radiator cooling fan 45 of the vehicle 30. As a result, hydrogen charging is performed in a shorter period of time compared to when the vehicle fan 45 is used to cool the radiator 35. Further, the structure of the existing cooling system of the vehicle 30 does not need to be changed.

(2) The drive controller 19, which includes the detector (switch 18) for detecting that the charging of hydrogen from the dispenser 13 to the hydrogen tank 31 has started, drives the blower 14 based on the detection signal from the detector. Therefore, the blower 14 is automatically driven when cooling is necessary.

(3) The detector for detecting that the charging of hydrogen from the dispenser 13 to the hydrogen tank 31 has started is formed by the switch 18, which is turned ON when the coupler 16 arranged on the hose 17 of the dispenser 13 is coupled to the hydrogen charging port 42a of the hydrogen tank 31. Therefore, the detector has a simple structure.

(4) The drive controller 19 adjusts the current flow of the blower 14 in accordance with the heat load of the radiator 35. This reduces the energy consumption of the blower 14.

(5) The fuel cell system 32 includes a plurality of hydrogen tanks 31. The heat medium flow passage 36 for supplying the heat medium to the hydrogen tanks 31 include the electromagnetic three-way valve 48 that is switched between a state in which the heat medium cooled by the radiator 35 sequentially flows through all of the hydrogen tanks 31 and a state the heat medium flows through at least a selected one of the hydrogen tanks 31. Therefore, the movement path of the heat medium is changed by the command signal from the controller 50 to obtain an appropriate state in each hydrogen tank 31. Further, heating and cooling of the hydrogen adsorption alloy MH in each hydrogen tank 31 are easily and properly performed.

Second Embodiment

A second embodiment of the present invention will now be described with reference to FIG. 3 focusing on the differences from the first embodiment. Components that are the same as the first embodiment are denoted with the same reference numbers and will not be described in detail. In the present embodiment, the hydrogen station 11 includes a cooling device 20, and the blower 14 blows air, which is cooled in the cooling device 20 to a temperature lower than the ambient temperature, towards the radiator 35.

Figure 3:
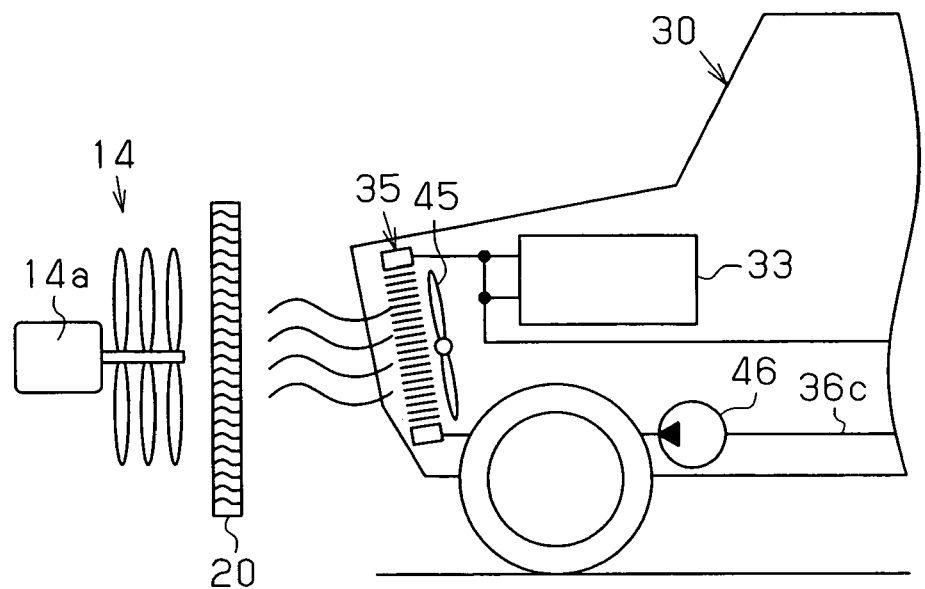
FIG. 3 is a schematic diagram showing a hydrogen station and a vehicle according to a second embodiment of the present invention.

As shown in FIG. 3, the cooling device 20 is arranged between the vehicle parking area of the hydrogen station 11 and the blower 14. The cooling device 20 is an evaporator forming part of, for example, a refrigeration circuit. Other components (compressor, condenser, expansion valve, etc.) of the refrigeration circuit are not shown. A refrigeration circuit having a known configuration may be used as the refrigeration circuit. The cooling device 20 includes a pipe through which the cooling medium circulated through the refrigeration circuit flows, with the pipe meandered to enlarge the surface area as much as possible. As a result, heat exchange between the air blown from the blower 14 and the cooling device 20 is efficiently performed.

Accordingly, the present embodiment has the advantage described below in addition to advantages (1) to (5) of the first embodiment.

(6) The blower blows air, which is cooled by the cooling device 20 to a temperature lower than the ambient temperature, towards the radiator 35. This improves the heat releasing effect of the radiator 35, lowers the temperature of the heat medium used to cool the hydrogen tanks 31, and shortens the time for charging hydrogen compared to when directly blowing the ambient air.

Third Embodiment

A third embodiment of the present invention will now be described with reference to FIG. 4 focusing on the differences from the first embodiment. Components that are the same as the first embodiment are denoted with the same reference numbers and will not be described in detail. The present embodiment relates to a vehicle 30 enabling efficient cooling of the radiator 35 with a fan (i.e., blower arranged in the hydrogen station 11) located outside the vehicle 30 when charging hydrogen at the hydrogen station 11. The structure of the hydrogen station 11 is the same as that in the first embodiment, and the fuel cell system installed in the vehicle 30 is the same as that in the first embodiment.

A compartment 51 equivalent to an engine room of a vehicle using an internal combustion engine as the driving source is defined at the front of the vehicle 30. The radiator 35 is arranged toward the front of the vehicle 30 in the compartment 51. A front grille 53 is integrally formed with a hood 52 covering the upper opening of the compartment 51. The hood 52 opens and closes the opening of the compartment 51. In a closed state, the front grille 53 is located at a position corresponding to at least the front of the radiator 35 and exposes the radiator 35 to the front of the vehicle 30 when the hood 52 is open.

Figure 4:
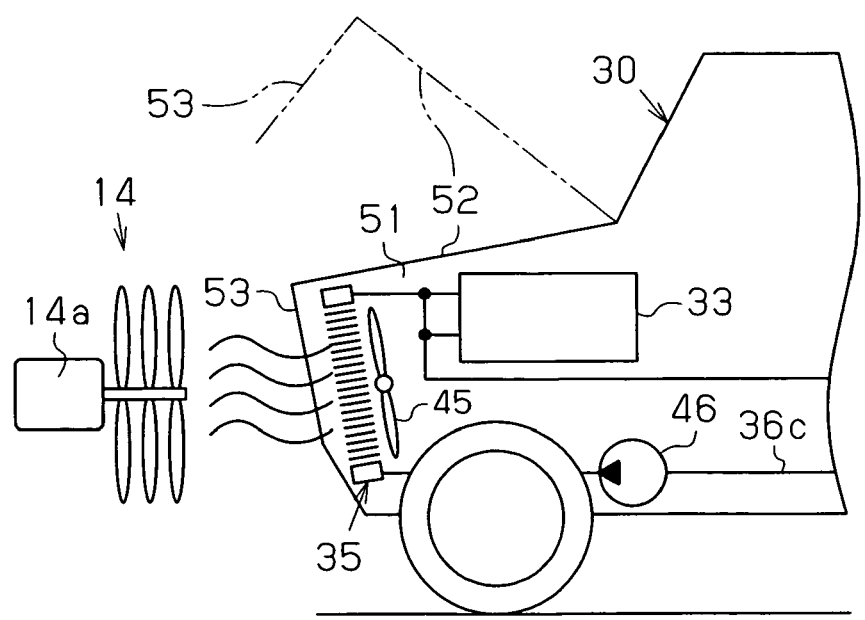
FIG. 4 is a schematic diagram showing a hydrogen station and a vehicle according to a third embodiment of the present invention.

In the present embodiment, the charging of hydrogen into the hydrogen tanks 31 of the vehicle 30 is performed at the hydrogen station 11 with the hood 52 in an open state as shown by the broken lines in FIG. 4. In a typical vehicle, the radiator is arranged toward the front in the engine room, and the portion in front of the radiator is covered by a front grille enabling the passage of air currents so that the air currents flow and pass through the radiator fan. Normally, the front grille is a grid-shaped or ladder-shaped partition wall acting as a resistance against the air currents passing through the front grille.

With regards to this point, in the vehicle 30 of the present embodiment, a portion of the front grille 53 covering the front of at least the radiator 35 moves with the hood 52 when the hood 52 opens and exposes the front of the radiator 35. In this state, the radiator 35 receives the air from the blower 14. This further improves the heat releasing effect of the radiator 35, and hydrogen is charged within a shorter period of time compared to a vehicle in which the front grille does not move with the hood.

Each of the above embodiments may be modified as described below.

The detector for detecting that the hydrogen filling to the hydrogen tank 31 has started is not limited to the switch 18 that is turned ON when the coupler 16 arranged on the hose 17 of the dispenser 13 is coupled to the hydrogen charging port of the hydrogen tank 31. For instance, a flow rate detection device for detecting the flow of hydrogen in the dispenser 13 may be used as the detector, and the drive controller 19 may start driving the blower 14 based on the detection signal output from the flow rate detection device when detecting the flow of hydrogen. Further, since the dispenser 13 usually includes a mass flowmeter, the mass flowmeter may be used as the flow rate detection device. Therefore, an additional flow rate detection device would not be necessary.

As the detector for detecting the starting of hydrogen charging, a sensor for detecting heat generation of the hydrogen tanks 31 may be arranged in the vehicle 30. When the heat generation of the hydrogen tank 31 is detected by the sensor, the information related to heat generation is transmitted from the vehicle 30 to the drive controller 19 of the hydrogen station 11.

Figure 5:
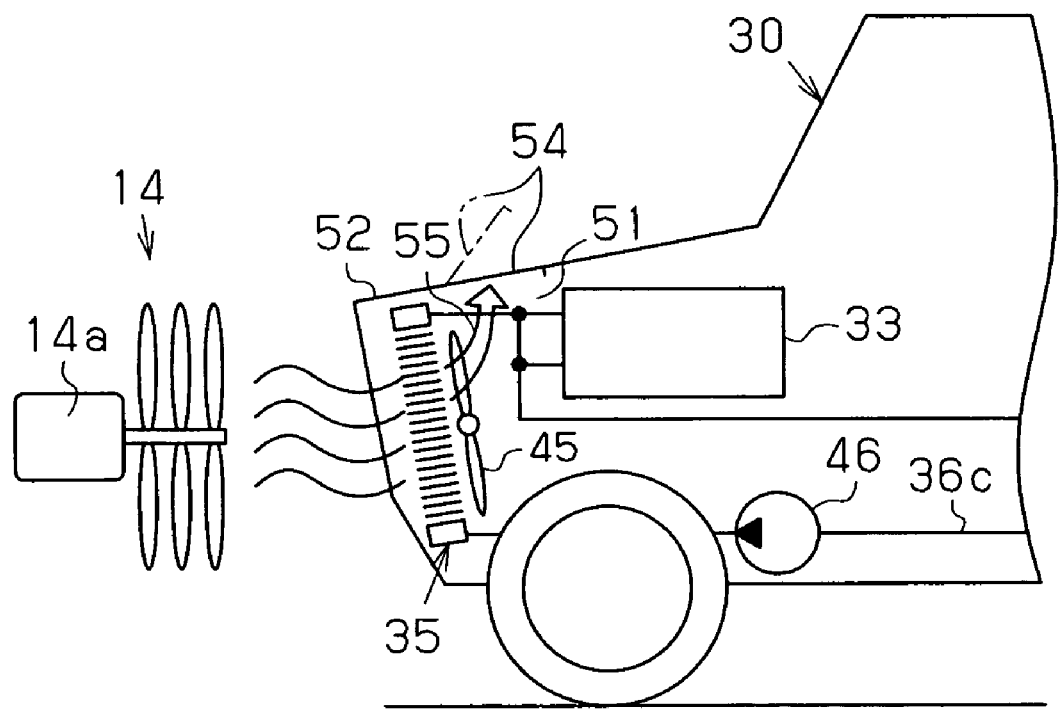
FIG. 5 is a schematic diagram showing a hydrogen station and a vehicle in a further embodiment.

The structure for efficiently cooling the vehicle radiator 35 with the air flow generated by the blower 14, which is arranged in the hydrogen station 11, during the charging of hydrogen at the hydrogen station 11 is not limited to the structure of the third embodiment shown in FIG. 4. For instance, the air blown against the radiator from outside the compartment 51, in which the radiator 35 is installed, may be smoothly discharged out of the compartment 51 through a passage extending through the vehicle 30. For example, a lid 54, which opens and closes, may be arranged in the hood 52 at a location that is in the vicinity of the radiator 35 when the hood 52 is closed, as shown in FIG. 5. The lid 54 is arranged on the downstream side of the radiator 35 with respect to the direction of the air flow generated by the blower 14. The lid 54 is closed when the vehicle 30 is traveling and is open when charging hydrogen, as shown by the broken lines. When the lid 54 is open, a discharge flow path 55 of the air (shown with an arrow in FIG. 5) is formed in the vehicle 30, and the blower 14 blasts air towards the radiator 35 so that the air current passes through the radiator 35 to be smoothly discharged from the compartment 51 along the flow path 55. That is, the flow path 55 enhances the discharge of the air blown by the blower 14 towards the radiator 35 and passing through the radiator 35 out of the compartment 51.

Various devices are normally accommodated in the compartment 51 where the radiator 35 is installed. Thus, it is difficult for the air blown from outside the compartment 51 towards the radiator 35 to escape from the compartment 51. In the present embodiment, however, if the blower 14 is driven with the lid 54 in an open state when charging hydrogen to the hydrogen tank 31 at the hydrogen station 11, the air that is blown from outside the compartment 51 flows towards the radiator 35 and passes through the radiator 35 to smoothly discharge out of the compartment 51 through the flow path 55. This improves the heat releasing effect of the radiator 35, and the charging of hydrogen within a shorter period of time becomes possible compared to when the flow path 55 does not exist. Since the lid 54 remains closed when the vehicle 30 is traveling, the flow path 55 is not formed when the vehicle 30 is traveling and thus does not affect the flow of air in the compartment 51 when the vehicle 30 is traveling.

The gas storage equipment 12 of the hydrogen station 11 is not limited to the structure in which the hydrogen cylinder assembly includes the plurality of cylinders 15a filled with hydrogen gas at a pressure greater than the pressure in the fully filled hydrogen tank 31. For example, a single high pressure tank that is larger than the cylinder 15a may be used as the gas storage equipment 12.

The hydrogen station 11 is not limited to a fixed type (stationary type), and may be a movable type arranged on a trailer or a container. In this case, if the fuel cell becomes widely used as household power sources, the charging of hydrogen to the hydrogen tank, serving as a hydrogen source installed in each household, is facilitated.

The use of the hydrogen station 11 is not limited to the charging of hydrogen to the hydrogen tanks 31 accommodating the hydrogen adsorption alloy MH and may also be used for charging hydrogen into hydrogen tanks that do not accommodate hydrogen adsorption alloy. If the vehicle radiator 35 is cooled by the blower 14 of the hydrogen station 11, the hydrogen charging may be completed in a shorter period of time than when using the vehicle fan 45 even when hydrogen tanks that do not accommodate the hydrogen adsorption alloy are installed in the vehicle, and the power for driving the vehicle fan 45 does not need to be consumed.

The hydrogen tanks 31 do not simultaneously have to be charged with hydrogen gas, and a valve may be arranged at each part of the pipe 42 connected to the hydrogen tanks 31 so that the hydrogen tanks 31 are charged with hydrogen one by one.

The pressure of the cylinders 15a and the hydrogen tanks 31 when charged with hydrogen to a full level is not limited to the above described pressures. For example, the hydrogen tanks in the fuel cell automobile may have a pressure of 25 MPa when fully charged with hydrogen, in which case, the pressure of the cylinders 15a in the fully charged state may be lower than 44 MPa.

Hydrogen gas having a pressure lower than the pressure when the hydrogen tank 31 is charged to the full level may be charged to the cylinders 15a of the gas storage equipment 12, and the hydrogen gas of the cylinders 15a may be supplied to the hydrogen tank 31 after being compressed and pressurized by the compressor.

The hydrogen supplied and filled to the gas storage equipment 12 does not have to be hydrogen that is generated in a facility differing from the hydrogen, station 11 and transported to the gas storage equipment 12. In the hydrogen station 11, fossil fuel may be reformed to produce hydrogen or water may be electrolyzed to produce hydrogen, and such hydrogen may be supplied or filled into the gas storage equipment 12.

The blower 14 does not have to be installed at a predetermined position in a stationary manner, and may be installed on a movable platform so as to be movable to a position facing the radiator 35 of the parked vehicle 30. In this case, even if the location of the radiator 35 relative to the vehicle 30 differs between vehicle types (for example, even if the radiator 35 is arranged at the rear of the vehicle 30 instead of the front), the movable platform may be used to move the blower 14 to the appropriate position.

The fuel cell 33 is not limited to a polymer electrolyte fuel cell and may be a phosphoric acid fuel cell, alkaline fuel cell, and the like with a heat medium for cooling.

The number of hydrogen tanks 31 installed in the vehicle 30 is not limited to four and may be three or less or five or more. That is, the fuel cell system 32 may be a system including one fuel cell 33 connected to a plurality of hydrogen tanks 31 or a system in which hydrogen is supplied from one hydrogen tank 31 to one fuel cell 33.

The hydrogen tank 31 may accommodate hydrogen adsorption material other than the hydrogen adsorption alloy, such as activated carbon fiber or single wall carbon nanotube.

The vehicle 30 is not limited to the fuel cell automobile and may be a vehicle using a hydrogen engine.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

The invention claimed is:

1. A hydrogen station for charging hydrogen into a hydrogen tank installed in a vehicle, the vehicle including a heat medium flow passage through which a heat medium for cooling the hydrogen tank flows, a radiator for cooling the heat medium flowing through the heat medium passage, and a fan for blowing air towards the radiator, the hydrogen station comprising:

gas storage equipment for storing hydrogen;
a dispenser for charging the hydrogen tank with hydrogen supplied from the gas storage equipment; and
a blower for blowing air towards the radiator with a current flow greater than that of the fan when charging the hydrogen.

2. The hydrogen station according to claim 1, further comprising a drive controller for driving the blower when the charging of hydrogen from the dispenser to the hydrogen tank starts.

3. The hydrogen station according to claim 2, further comprising a detector for detecting that the charging of hydrogen from the dispenser to the hydrogen tank has started, wherein the drive controller drives the blower based on a detection signal from the detector.

4. The hydrogen station according to claim 3, wherein the vehicle includes a hydrogen charging port, the dispenser includes a coupler that is connectable to the hydrogen charging port, and the detector is a switch for detecting that the coupler is connected to the hydrogen charging port.

5. The hydrogen station according to claim 1, further comprising a cooling device for cooling the air blown from the blower towards the radiator.

6. The hydrogen station according to claim 1, further comprising a drive controller for controlling the blower so as to adjust the current flow of the blower in accordance with heat load applied to the radiator.

7. A method for charging hydrogen into a hydrogen tank installed in a vehicle, the vehicle including a heat medium flow passage through which a heat medium for cooling the hydrogen tank flows, a radiator for cooling the heat medium flowing through the heat medium flow passage, and a fan for blowing air towards the radiator, the method comprising:

charging hydrogen into the hydrogen tank with the vehicle parked at a hydrogen station; and blowing air from a blower arranged at the hydrogen station towards the radiator with a current flow greater than that of the fan when charging the hydrogen.

* * * * *